Patented Feb. 15, 1927.

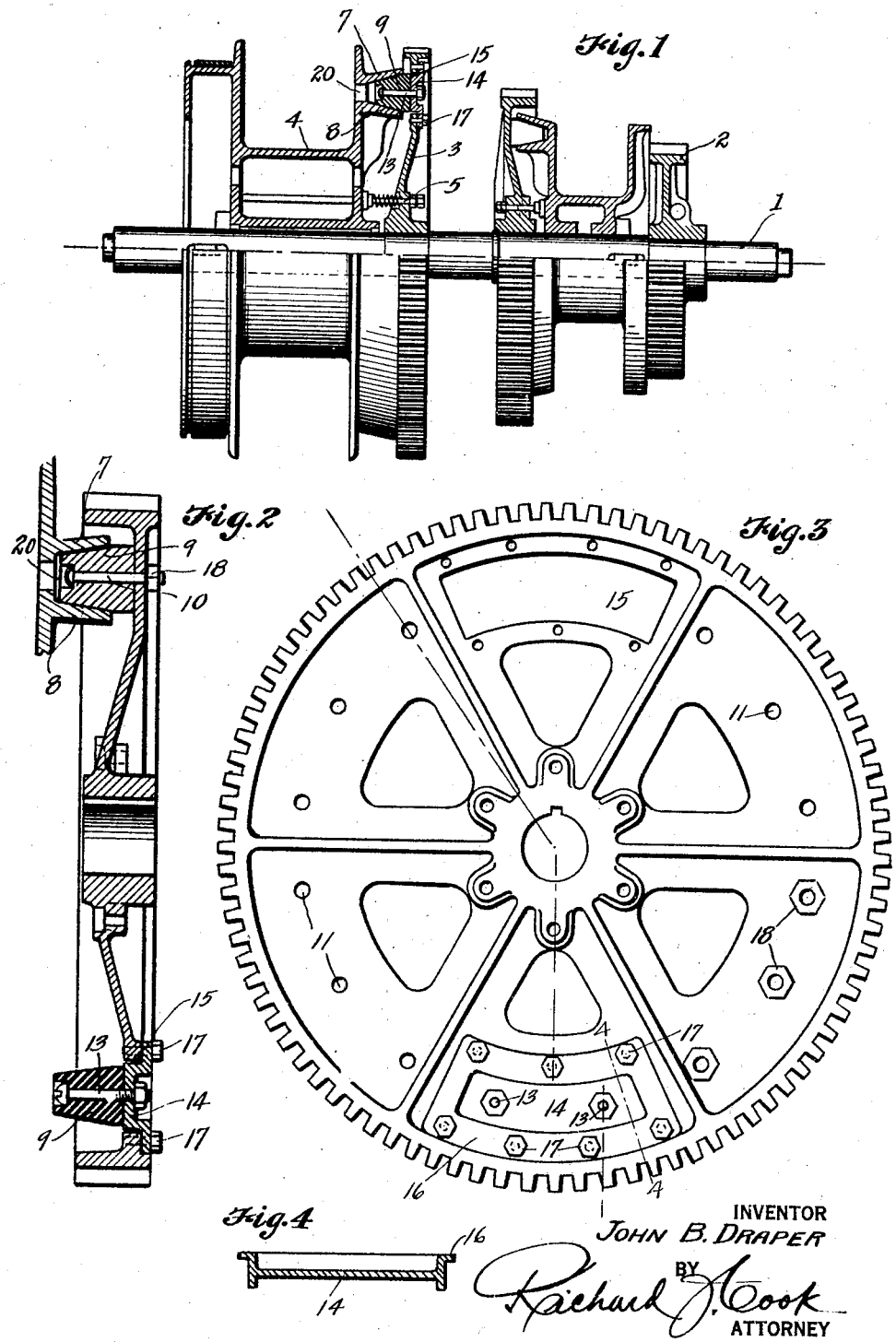

1,617,679

UNITED STATES PATENT OFFICE.

JOHN B. DRAPER, OF TACOMA, WASHINGTON, ASSIGNOR TO PUGET SOUND IRON & STEEL WORKS, OF TACOMA, WASHINGTON.

CLUTCH MECHANISM.

Application filed December 11, 1923. Serial No. 679,881.

This invention relates to improvements in friction driven, power transmission mechanism, and particularly to clutch mechanism of that type wherein one member is provided with clutch receiving surfaces and the other with clutch blocks that are adapted to be frictionally engaged with said surfaces so that one will be driven by the other. The invention relates particularly to driven hoists, donkey engines, and engines of similar types, or those used for analogous purposes, wherein power is transmitted through friction clutches.

Explanatory to the invention, I will state here that in most engines of the type with which the present construction is adaptable for use, the driven member is provided with a plurality of circularly arranged clutch blocks and the member to be driven, is provided with clutch receiving surfaces adapted, by shifting either the driven member, or the other member, to be engaged by the blocks to effect the frictional driving connection. These parts, namely, the clutch disk and the drum, are mounted upon a driving shaft. The clutch blocks, incidental to their use, will in time become worn to such extent that it is required that they be replaced and this necessitates disassembling of the parts, which cannot be done, except by removal of the driving shaft, and dismounting of the drum, all of which requires considerable time, labor and expense.

In view of the above, it has been the object of this invention to provide a construction that will permit the replacing of clutch blocks without necessitating the disassembly of parts as above stated, and which provides for the removal of the blocks from functional position through openings provided in the clutch disk or gear.

Other objects of the invention reside in the various details of construction and combination of parts as will be described in the following specification and finally pointed out in the claims terminating the same.

In accomplishing these and other objects of the invention, I have provided the improved details of construction, the preferred forms of which are illustrated in the accompanying drawings, wherein—

Figure 1 is a view, partly in side elevation and partly in section, showing the assembly of parts embodied by the present invention.

Figure 2 is a central sectional view of the clutch gear particularly illustrating the manner of mounting the clutch blocks thereon.

Figure 3 is a face view of the clutch gear.

Figure 4 is a sectional view taken on the line 4—4 in Figure 3.

Referring more in detail to the several views of the drawings—

1 designates what may be the driving shaft of a hoist, donkey or other engine, of that character with which the present construction is to be used and which may be mounted in any suitable manner, not shown, and driven rotatably by means of a driving connection with a gear wheel 2 that is fixed thereon. In Figure 1, I have shown the assembly of parts of a machine known as a "two speed yarder" which uses two clutch assemblies, but since they are identical, only one will be described in detail with the understanding that the description would relate to either.

Keyed, or otherwise fixed to shaft 1, is a clutch gear 3 adjacent one side of which a drum 4 is slidably and rotatably mounted and which is normally adapted to be yieldingly retained in disconnected relation with the clutch gear by means of a plurality of spring pressed bolts 5 supported slidably adjacent the hub portion of the gear, but which may be shifted longitudinally of the shaft 1, by suitable mechanism, not herein illustrated, into and from position where it will be driven. Formed on the inner flange of the drum, concentrically about the shaft, are clutch flanges 7 and 8 in outwardly flared relation for receiving thereagainst the tapered clutch blocks 9 that are carried by the clutch gear on its inner face. These blocks are arranged circularly about the shaft, and all but one or two are secured to the gear by means of bolts 10 extended through apertures 11 in the web 12 of the gear. Those which are not thus secured are removably secured by bolts 13 on the inner faces of supporting plates 14 that are fitted removably within openings 15 in the web of the gear and which have peripheral flanges 16 overlying the web about the edges of the openings and secured thereto by means of bolts 17 extended therethrough. When it becomes necessary or is desired to replace the clutch blocks with new ones, one, or both of the plates 14, with clutch blocks thereon, are released from the gear by removal of bolts 17 thereby leaving the openings 15 unobstructed so that the other blocks may then be removed therethrough. These other blocks are released by the removal therefrom of the bolts 10, this being done after the nuts 18 which hold the bolts, have been removed and the bolts 10 driven outwardly through openings 20 provided for this purpose in the drum flange, as shown in Figure 1. After bolts 10 have been removed, the blocks may be shifted into registration with one of openings 15 and removed therethrough. The new blocks will then be installed by being inserted through the openings 15 and moved into place to receive the bolts 10 through openings 20 in the drum. New blocks would then be attached to the plates 14 and the latter again attached by the bolts 16 within the openings 15, as shown in Figure 2.

With this construction and mode of assembly, it is possible to replace an entire set of blocks in a very short time and without necessitating the removal of any part or parts from the driving shaft.

While I have shown the clutch gear equipped with two openings 15 through which the blocks may be removed and inserted, only one is really required, but two make the assembly more easily accomplished.

Having thus described my invention, what I claim as new therein and desire to secure by Letters Patent, is:

1. In a clutch mechanism, a drum provided with clutch surfaces, a clutch gear adjacent the drum having an opening therein, clutch blocks secured detachably to the inner face of the gear in co-operative relation with the said surfaces of the drum and adapted to be removed and replaced through said gear opening.

2. In a clutch mechanism, a drum provided with clutch receiving surfaces, a clutch gear adjacent to the drum having an opening therein, clutch blocks secured detachably to the inner face of the clutch gear in functional relation to the clutch surfaces of the drum and adapted to be applied or removed, when detached, through the said opening, a plate fitted within said opening and detachably secured to the gear and a clutch block detachably fixed to the said plate.

3. In a clutch mechanism, a driving shaft, a drum rotatable on the shaft provided with clutch block receiving flanges and having apertures therein for the removal or application of bolts, a clutch gear on the shaft adjacent to the drum, clutch blocks secured to the gear by bolts that may be brought into registration with and removed through the drum apertures to thereby release the blocks; said gear having an opening therein through which said blocks, when released, may be removed.

4. In a clutch mechanism, a drum provided with clutch receiving surfaces, a clutch gear operable adjacent the drum having openings therein, plates adapted to be fitted within said openings and detachably secured to the gear to permit their removal outwardly therefrom, and clutch blocks secured detachably to said plates in co-operative relation with said clutch surfaces of the drum.

5. In combination, a driving member provided with detachable friction blocks, a driven member provided with a part engageable with said friction blocks, said driving member being provided with an opening through which said blocks may be placed in or removed from position on the driving member, and a removable closure for said opening on which one of said friction blocks is mounted.

6. In combination, a driving member, a driven member, one of said members being provided with detachable friction blocks and an opening through which said blocks may be placed in or removed from position on their member, a closure for said opening on which one of said blocks is mounted, the other of said members being provided with a friction part engageable with said blocks.

7. In combination, a driving member, a driven member, friction blocks having converging friction faces, said blocks being bolted to one of said members along an annular seat, so that they are easily moved circumferentially along their seats when the bolts are removed, an opening in said annular seat through which said blocks may be passed, and the other one of said members having a friction part with diverging faces to engage the converging faces of said friction blocks.

Signed at Tacoma, Pierce County, Washington, this 26th day of November, 1923.

JOHN B. DRAPER.